April 5, 1932. F. MAXWELL 1,852,055
EXTRACTION OF JUICE FROM SUGAR CANE AND KINDRED SUBSTANCES
Filed June 25, 1926 3 Sheets-Sheet 1

Inventor
Francis Maxwell,
By Toulmin & Toulmin,
Attorneys

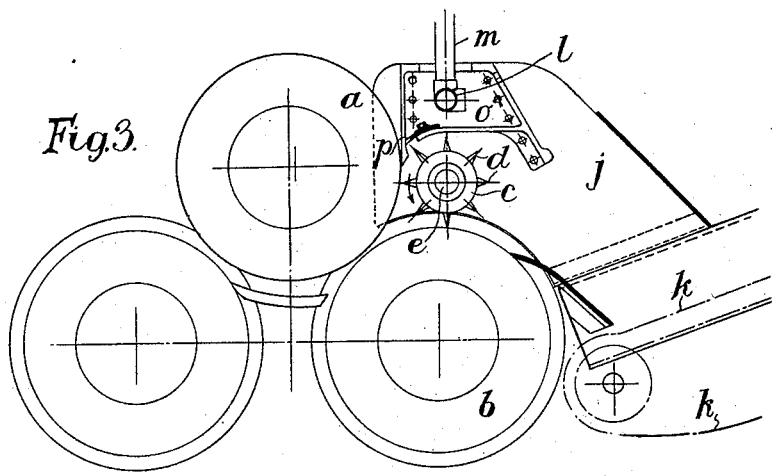
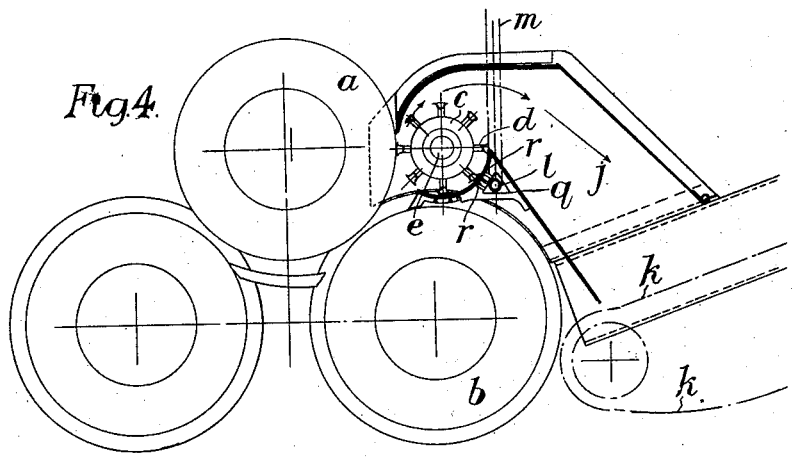
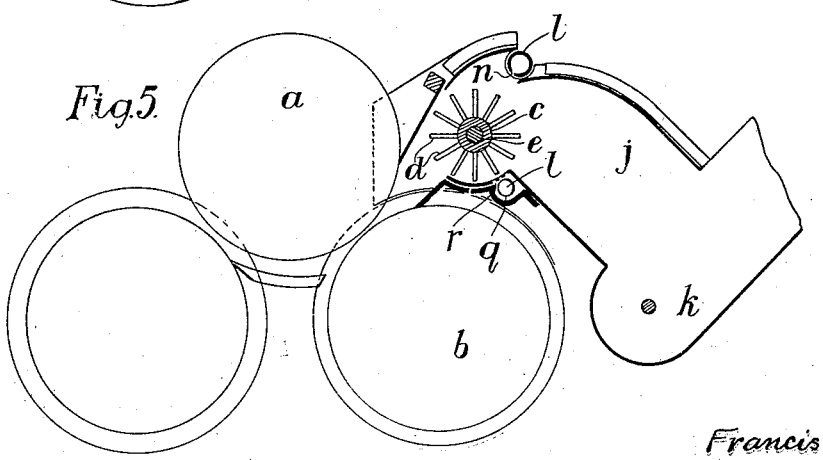

April 5, 1932. F. MAXWELL 1,852,055
EXTRACTION OF JUICE FROM SUGAR CANE AND KINDRED SUBSTANCES
Filed June 25, 1926 3 Sheets-Sheet 3
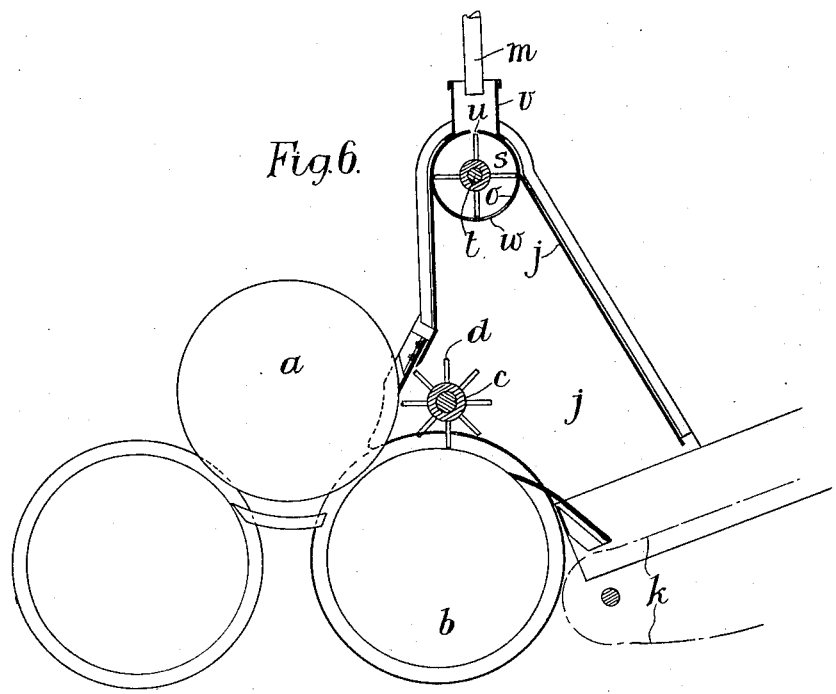
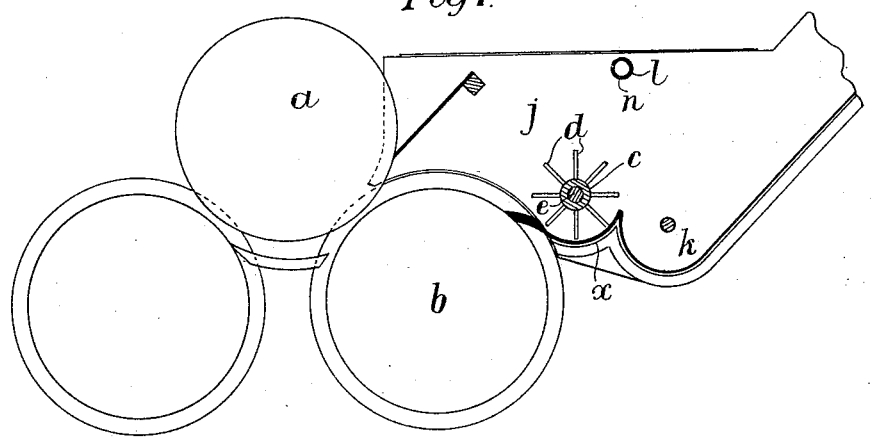
Inventor
Francis Maxwell,
By Toulmin & Toulmin
Attorneys Patented Apr. 5, 1932

1,852,055

UNITED STATES PATENT OFFICE

FRANCIS MAXWELL, OF WALLINGTON, ENGLAND

EXTRACTION OF JUICE FROM SUGAR CANE AND KINDRED SUBSTANCES

Application filed June 25, 1926, Serial No. 118,587, and in Great Britain July 9, 1925.

My invention relates to the extraction of juice from sugar cane and kindred substances.

The invention is particularly applicable to the process wherein sugar cane is successively crushed in a series or train of mills, and the crushed cane is subjected between every pair of mills, or some of the pairs, to a macerating agent, such as water, weak juice, or a mixture of steam and either of these liquids, applied by spraying, bathing or other action.

This process is disadvantageous inasmuch as the crushed cane issues slowly from the mill as a compressed layer-like or blanket-like mass of considerable thickness and elasticity, which immediately swells or expands, or tends to swell or expand, into a segregated mass of increased thickness, great porosity and high absorbancy. The macerating agent, as a result, cannot penetrate equally to all parts of the mass because air enters with greater facility than the macerating agent and the outer portions of the mass take up an undue proportion, leaving little for the inner portions. Further, when air first penetrates the finer interstices of the mass the macerating agent is unable to follow or, at any rate, enter freely whereby its action is prevented or impeded.

The object of my invention is to obtain an equable distribution of the macerating agent to all parts of the mass and the efficient absorption of the agent, thereby avoiding the defects of the existing process, and generally attaining the ultimate end in view in a simple and effective manner.

Therefore, my invention comprises a process, and apparatus for carrying the process into practice, according to which the cane is subjected to cyclically repeated groups of operations each comprising crushing, agitating and/or shredding and macerating steps transposably associated in near or distant relationship with each other; or, expressed otherwise, I, to achieve my object, subject the mass of crushed cane to agitation simultaneously, or substantially simultaneously, with the supply of the macerating agent at a position adjacent to, or spaced from, the region of initiating the agitation, which region may be anterior or posterior to the region of the supply of the macerating agent, and this I effect by a mechanical or a fluid (liquid or gaseous) agitator and by means for supplying the macerating agent, both positioned in, or in contiguity to, the path of the moving mass of crushed cane and associated in close or remote relationship with each other and with the crushing rollers in the sequence mentioned or in the reversed sequence, the agitation being effected with or without shredding.

Consequently, in a process in which my invention is incorporated (subject to the inclusion or omission of the shredding action) the cane is subjected to a series of crushing, agitating and macerating steps whereof the agitating and macerating steps are capable of transposition, but whatever their sequence, disregarding the terminal stages of the process, they are always preceded and succeeded by crushing which may be entirely effected by heavy mills, or by these mills supplemented by interposed light mills operating as mangles with the object of extracting juice between the agitating and macerating steps, whether the apparatuses complemental to these steps are in close or distant relationship with each other and with the crushing apparatus, and whether in the order mentioned or in the opposite order.

The agitator and the means supplying the macerating agent may be variously constituted and co-related to compose a unit forming a component of a mill, which unit or component, in a new mill, is or may be built integrally with it, whilst, in an existing mill, it is assembled as an attachment or fitting. For instance, the agitator may be constructed as a rotor operating at a higher speed than the mill rollers, and the macerating agent supply means may comprise a device or devices adapted to supply the agent in sheet, stream, jet or other form in any desired relation with the rotor or so that it is broken up by the rotor. Alternatively, the agitator may consist of means supplying a fluid or fluids under pressure, the fluid or fluids being either liquid or gaseous or a mixture of liquid and gas.

It will be evident that the constructive details of the agitator and the means supplying the macerating agent may be variously constructed to meet particular designs or requirements without affecting the main features of my invention, sundry embodiments of which I have represented in the accompanying drawings as typical examples illustrating the application to a three-roller mill of ordinary type and including a mechanical agitator.

I will now fully describe my invention with reference to these drawings, premising that of the various figures:

Figs. 3, 4 and 5 are fragmentary transverse sectional elevations, each of a modification directed to the means supplying the macerating agent.

Fig. 6 is a fragmentary transverse sectional elevation of another form of the means supplying the macerating agent.

Fig. 7 is a fragmentary transverse section of a modification relating to the rotor.

The same letters of reference are used throughout to designate the same or corresponding parts.

Figure 1:
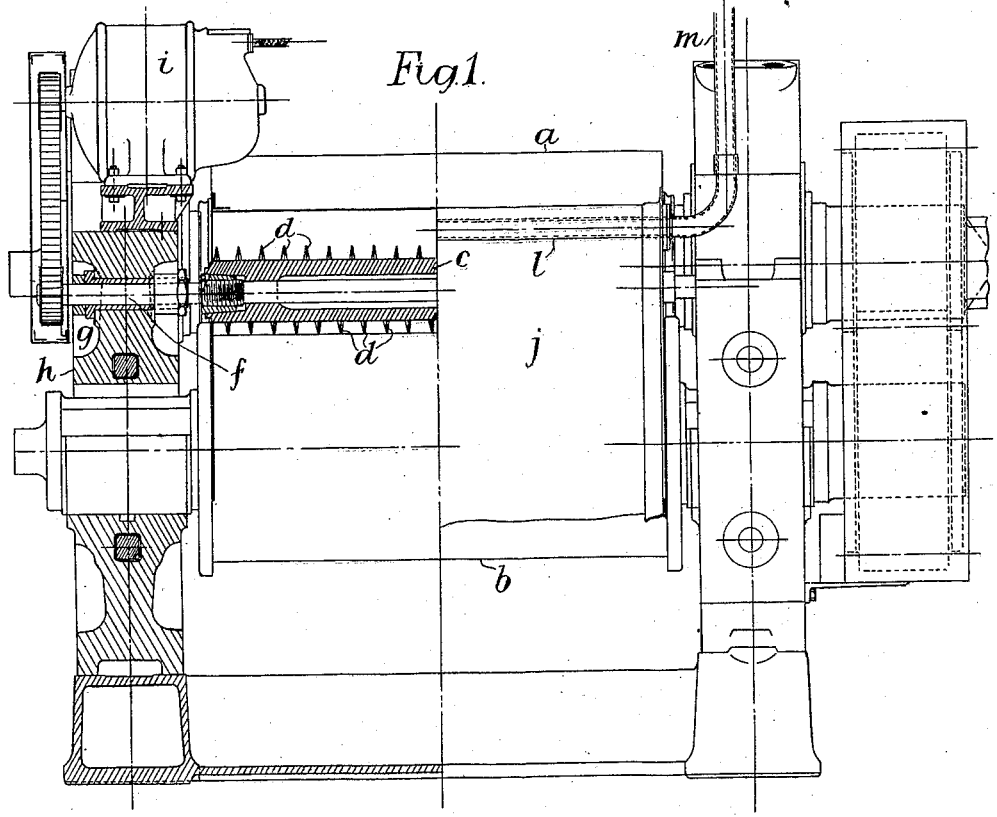
Fig. 1 is a side sectional elevation of one construction.
Figure 2:
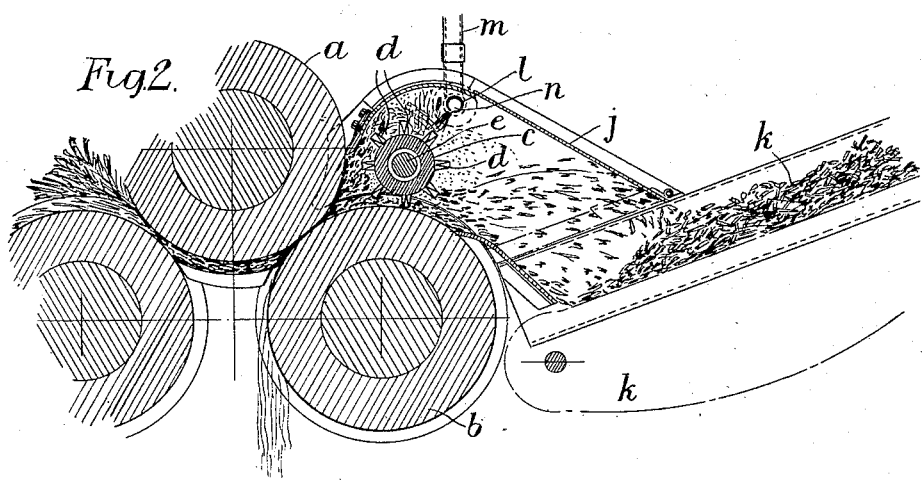
Fig. 2 is a fragmentary transverse sectional elevation thereof.

I will first refer to Figs. 1 and 2. In this form of the invention, behind the upper mill roller $a$ and above the delivery mill roller $b$ I position the agitator in the form of a hollow cylinder $c$ provided throughout its circumference with spaced disintegrating elements, such as teeth, spikes or bristles $d$—$d$. The cylinder $c$, which is of small diameter as compared with the mill rollers $a$ and $b$, is secured to a shaft $e$ passed centrally through it and extended beyond its ends to form at each extremity a journal $f$ which is rotatably supported in an adjustable or fixed bearing $g$ provided in, or connected to, the mill framing $h$. This shaft $e$ is driven either directly or, as shown, indirectly by an independent motor $i$ supported on the mill framing $h$ or otherwise, or it may be driven from the mill gearing, but in any case the arrangement is such that the shaft $e$ is revolved at a greater speed than the mill rollers. Thus the cylinder $c$ constitutes a rotor mounted in close proximity to the delivery from the mill rollers $a$ and $b$, and, therefore, in the direct path of the discharged crushed mass. Consequently, as the mass emerges from between the rollers $a$ and $b$ it comes under the influence of the rotor $c$.

The macerating agent is delivered into a structure $j$ adapted to enclose the rotor $c$ and the portions of the mill rollers $a$ and $b$ immediately adjacent thereto, and designed to confine the mass while subject to agitation by the rotor $c$ and to the action of the macerating agent, as well as guide it on its course for subsequent treatment. Appropriately, this structure $j$ is fashioned as a casing or hood secured to the mill framing $h$ and associated with the usual conveyor $k$.

The macerating agent is delivered into the top of the enclosing structure $j$ and directed towards the side of the rotor $c$ distant from the mill rolls $a$ and $b$. The means for this purpose comprise a pipe $l$ positioned within the structure $j$ and connected to an exteriorly-arranged pipe $m$ communicating with the source of supply of the agent which may be under appreciable pressure if desired. The pipe $l$ within the enclosing structure $j$ is provided along its whole length and at the part of its face nearest the rotor $c$ with a slot $n$, or with a plurality of apertures, whereby the agent is discharged as a long single jet, or a plurality of spot jets. Alternatively, the slot $n$ or apertures may be substituted by an injector or injectors.

It will now be seen, as is also diagrammatically represented in Fig. 2, that the crushed cane issues from between the mill rollers $a$ and $b$ as compressed layer-like or blanket-like mass whereupon it is immediately acted up on by the rotor $c$ whose teeth, spikes or bristles $d$—$d$ function to break it up, or scatter it, or violently agitate it into fragmental condition while simultaneously the segregated fragments or flocculent particles are impregnated with the jetted macerating agent, which itself is also broken up and scattered or disseminated or dissipated by the rotor $c$, thus producing an effective and uniform permeation enhancing the subsequent cushions.

Obviously, instead of the arrangement described, the shaft $e$ of the rotor may be fixed and the cylinder $c$ revolubly mounted thereupon and suitably driven.

I will next refer to Figs. 3, 4 and 5 which illustrate differing positionings of the pipe $l$ supplying the macerating agent as compared with the disposition explained with regard to Figs. 1 and 2. In these and subsequent figures parts are shown and marked with reference letters which will not be specifically referred to, but in this connection it is to be understood that their arrangement and operation are the same as described with regard to a preceding figure or figures.

Fig. 3 shows that the pipe $l$ within the enclosing structure $j$ associated with the rotor $c$ may be situated within, and adapted to deliver the agent to, a compartment $o$ formed within the structure $j$ and provided with an outlet $p$, or there may be a plurality of outlets, immediately adjacent the space intervening between the circumference of the top roller $a$ of the mill and the rotor $c$. Hence, in this case, the crushed mass becomes subject to the agent before, or almost before, it becomes subject to the action of the rotor $c$.

Alternatively, as shown in Fig. 4, the pipe $l$ may be positioned within a chamber $q$ constructed at the lower side of the structure $j$ in the region of the lower portion of the circumference of the rotor $c$ remote from the top roller $a$. Communication between the structure $j$ and the chamber $q$ is established by a plurality of spaced apertures $r$—$r$, and, in consequence, the agent is directed upon the underside of the mass immediately it becomes subject to agitation.

Again, as will be obvious from these two examples just described, the pipe $l$ may be constituted and adapted to direct the agent in two or more supplies relatively to the rotor $c$ and the mass subject, or to be subject, to its agitation, such as above and below, or above, below and laterally of the rotor. Fig. 5 represents an arrangement wherein the macerating agent is introduced above and below the rotor $c$. The upper pipe $l$ is positioned practically as shown in Fig. 2 excepting that it is housed in a cavity in the structure $j$, whilst the lower pipe $l$ is situated in, and associated with, a chamber $q$ after the style of the variant illustrated in Fig. 4.

The means $l$ supplying the macerating agent in each of the foregoing examples is of a stationary character, that is to say it does not affect any disturbance of the agent, the agent being agitated or diffused by the rotor $c$. The means, however, may be adapted to impart a positive and initial agitation and consequent dissimination to the agent prior to its delivery to the rotor $c$ which will thus supplement the agitation or dissipation. Such an arrangement is illustrated in Fig. 6. I, according to it, provide a rotor $s$ in direct connection with the supply pipe $m$. The rotor $s$ is represented as of a similar type to the rotor $c$, although it may, of course, be of any kind; and it is suitably associated with a shaft $t$ mounted in the sides of the structure $j$ which is prolonged and adapted for the purpose. The shaft $t$ of the rotor $s$ may be driven directly, and the shaft $e$ of the rotor $c$ driven from it in suitable manner, although the shaft $t$ may be otherwise driven. The structure $j$ is shaped to form a compartment $o$, after a variant of the construction depicted in Fig. 3, wherein the rotor $s$ is housed, the top being slotted at $u$ to receive the agent from a pocket or well $v$ whereinto the pipe $m$ delivers the supply, the well $v$ and the slot $u$ being the equivalent of the pipe $l$ and slot $n$ of the construction exemplified in Fig. 2. The bottom of the compartment $o$ is slotted as indicated at $w$ for the discharge of the agent into the structure $j$. Thus the slot $u$ effects the distribution of the agent to the compartment $o$, and the slot $w$ the distribution to the rotor $c$. Obviously, the slot $w$ may be dispensed with and the bottom of the compartment left completely open. Thus the agent delivered to the compartment $o$ is initially broken up by the rotor $s$ before it reaches the rotor $c$ where it is broken up still more, hence it reaches the cane mass as a spray or in a mist-like form which ensures an effective permeation with the consequential advantages.

I have exemplified the rotor $c$ and the macerating pipe $l$ as being closely positioned relatively to the mill rollers $a$ and $b$ and to each other, but this, as hereinbefore stated generally, is not an arbitrary disposition because they may be situated at a distance from the rollers and from each other. For instance, the rotor $c$ may, as represented in Fig. 7, be located distantly from the mill rollers $a$ and $b$ and associated with an existing shoot plate, conveyor element or the like $x$ on the delivery side of the mill, the pipe $l$ being correspondingly situated as shown in full lines although in close contiguity to the rotor $c$, but it may be located close to the mill in any of the ways described with reference to the other examples and, therefore, remote from the rotor $c$.

Throughout, I have described the agitator as being of the rotary type, but it may be of the reciprocatory or of any other kind; and, further, it may consist of means or a machine for supplying compressed air or other fluid or liquid or a solid medium under pressure and directing it upon the crushed-cane mass.

What I claim and desire to secure by Letters Patent is:

1. In a cane mill, means for crushing and disintegrating cane, rotary means adapted to engage the cane while supported by said crushing means to break the cane up into particles and to scatter the particles, said rotary means being provided with a series of arms adapted to engage the cane to scatter it, and means for introducing a macerating agent to said cane while thus scattered.

2. In a machine for acting on sugar cane or the like, a pair of cooperating rolls adapted to crush and disintegrate cane, means adapted to engage the cane discharged from and while supported by said rolls to break the cane up into particles and to scatter the particles, and means for introducing a macerating agent to the cane while in a scattered condition.

3. In a machine for acting on sugar cane or the like, a pair of cooperating rolls adapted to crush and disintegrate cane, a rotary beater adapted to engage the cane discharged from and while supported by said rolls to break the cane up into particles and to scatter the particles, and means for introducing a macerating agent to the cane while in a scattered condition.

4. In a machine for acting on sugar cane or the like, a pair of cooperating juice expressing rolls, means for receiving and supporting the cane discharged from said juice expressing rolls, an agitator, said agitator being spaced from said juice expressing rolls and adapted to act on the cane supported on said receiving means to break the cane up into particles and to scatter the particles, and means for introducing a macerating agent to the cane while in a scattered condition.

5. In a machine adapted to act on sugar cane or the like, a pair of cooperating juice expressing rolls, means for receiving cane from said juice expressing rolls, a rotary agitator, said agitator being driven at a relatively high speed and provided with a series of arms adapted to engage the cane supported on said receiving means to break the cane up into particles and to scatter the particles, and means for introducing a macerating agent to the cane while being broken up into particles by said rotary beater and while in a scattered condition.

In testimony whereof, I affix my signature.

FRANCIS MAXWELL.